US009555576B2

(12) United States Patent
Kobayashi et al.

(10) Patent No.: US 9,555,576 B2
(45) Date of Patent: Jan. 31, 2017

(54) METHOD FOR PRODUCING RESIN BOTTLES

(75) Inventors: Toshiya Kobayashi, Tokyo (JP); Toshiaki Iizuka, Tokyo (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 378 days.

(21) Appl. No.: 14/112,560

(22) PCT Filed: May 22, 2012

(86) PCT No.: PCT/JP2012/062989
§ 371 (c)(1),
(2), (4) Date: Oct. 30, 2013

(87) PCT Pub. No.: WO2012/161171
PCT Pub. Date: Nov. 29, 2012

(65) Prior Publication Data
US 2014/0077404 A1   Mar. 20, 2014

(30) Foreign Application Priority Data
May 25, 2011 (JP) .................................. 2011-116864

(51) Int. Cl.
 *B29C 49/78* (2006.01)
 *B29C 49/06* (2006.01)

(52) U.S. Cl.
CPC ............ *B29C 49/783* (2013.01); *B29C 49/78* (2013.01); *B29C 49/786* (2013.01); *B29C 49/06* (2013.01); *B29C 2795/002* (2013.01)

(58) Field of Classification Search
CPC .................................................. B29C 49/786
(Continued)

(56) References Cited

U.S. PATENT DOCUMENTS 3,950,459 A * 4/1976 Seefluth ............. B29C 49/6436
 219/388
5,102,588 A   4/1992 Feuerherm
(Continued)

FOREIGN PATENT DOCUMENTS

CN      101249721 A    8/2008
DE   102008052611 B3    4/2010
(Continued)

OTHER PUBLICATIONS

International Search Report and Written Opinion dated Aug. 28, 2012 for PCT/JP2012/062989 filed on May 22, 2012.
(Continued)

*Primary Examiner* — Michael N Orlando
*Assistant Examiner* — Kimberly A Stewart
(74) *Attorney, Agent, or Firm* — Drinker Biddle & Reath LLP

(57) ABSTRACT

The present invention provides a method for producing a resin bottle formed from a preform as a prototype by a blow molding process. The method comprises: a first step of measuring each of weights or wall thicknesses of a plurality of inspection parts set in a body portion of the preform; a second step of comparing each of the weights or the wall thicknesses measured by the first step with a preset set value, and thereby inspecting a difference between each of the weights or the wall thicknesses measured by the first step and the set value for each of the inspection parts; and a third step of adjusting a condition for blow molding in the blow molding process in accordance with an inspection result of each of the inspection parts.

4 Claims, 4 Drawing Sheets

(58) Field of Classification Search
USPC .................................................. 264/40.3, 40.4
See application file for complete search history.

(56) References Cited

U.S. PATENT DOCUMENTS

| | | | |
|---|---|---|---|
| 5,389,332 | A | 2/1995 | Amari et al. |
| 5,840,223 | A | 11/1998 | Feuerherm et al. |
| 6,227,838 | B1 | 5/2001 | Linss et al. |
| 6,258,301 | B1 | 7/2001 | Feuerherm et al. |
| 2005/0033562 | A1 | 2/2005 | Narushima et al. |
| 2006/0028658 | A1 | 2/2006 | Semersky et al. |
| 2006/0058911 | A1* | 3/2006 | Schnabel ................ B29C 49/78 700/197 |
| 2011/0024953 | A1* | 2/2011 | Winzinger .............. B29C 49/12 264/531 |
| 2011/0260350 | A1* | 10/2011 | Haesendonckx ....... B29C 49/78 264/40.1 |

FOREIGN PATENT DOCUMENTS

| | | |
|---|---|---|
| EP | 0776752 A1 | 6/1997 |
| EP | 1719970 A2 | 11/2006 |
| GB | 2 178 361 A | 2/1987 |
| JP | S62-30020 | 2/1987 |
| JP | H04-64411 A | 2/1992 |
| JP | H05-301274 A | 11/1993 |
| JP | H06-143392 A | 5/1994 |
| JP | H11-179794 A | 7/1999 |
| JP | 2002-307540 A | 10/2002 |
| JP | 2003-062896 A | 3/2003 |
| JP | 2012245633 A | 12/2012 |

OTHER PUBLICATIONS

Chinese Application No. 201210163812.9—Chinese Office Action mailed Feb. 11, 2014.

EP Application 12789773.4—Extended European Search Report mailed Aug. 21, 2015.

Automatische Prüfung von PET-Vorformlingen, "Qualitätskontrolle im Frühstadium" PLASTVERARBEITER, HUETHIG GMBH, 2005, vol. 56, No. 5, pp. 74-75.

* cited by examiner (a)

(b)

METHOD FOR PRODUCING RESIN BOTTLES

CROSS REFERENCE TO RELATED APPLICATIONS

This application is the National Stage of International Application No. PCT/JP2012/062989, filed May 22, 2012, and claims benefit of Japanese Application No. 2011-116864, filed on May 25, 2011, all of which are herein incorporated by reference in their entirety.

TECHNICAL FIELD

The present invention relates to a method for producing a resin bottle formed from a preform as a prototype by a blow molding process.

BACKGROUND

Some containers for containing liquid contents such as drinks are made of various materials. A synthetic resin bottle, for example, a bottle blow-molded of polyethylene terephthalate (or a PET bottle), is known as a type of container as described above. Patent Literature 1 discloses a method for forming a PET bottle from a preform as a prototype by a blow molding process. Specifically, a closed-end cylindrical preform having an opening at one end and closed at the other end is heated, and a body portion of the preform is inserted into a mold formed in the same shape as an outer shape of the PET bottle, with a neck portion of the preform on the opening side thereof gripped. Then, high-pressure air is introduced into the preform through its opening to expand the preform so as to bring the preform into intimate contact with the inside of the mold, thereby forming the PET bottle. The PET bottle, when undergoing quality inspection, is divided into plural cutoff pieces by being cut in section for each of inspection parts.

FIG. 7 is a view of a state of a PET bottle as cut for each of inspection parts. In an example of FIG. 7, a PET bottle 10 is divided into four cutoff pieces 10a to 10d. The quality inspection involves measuring the cutoff pieces 10a to 10d for weight, wall thickness, buckling strength or the like, and comparing measured results with a preset set value, thereby inspecting the PET bottle for quality. When there is a great difference between the measured results and the set value, the results of the quality inspection are fed back into the blow molding process to adjust a condition for blow molding, such as the temperature of the preform. This improves the yield rate of the PET bottle. For example, a part in which the wall thickness is less than the set value can be considered to be a thin-walled part of the preform as compared to other parts. This can be considered to be due to the fact that the thin-walled part of the preform is prone to conduct heat and thus, in the blow molding process, the thin-walled part rises high in its temperature relatively to other parts and hence expands larger than other parts by the introduction of the high-pressure air. Therefore, setting the temperature of the thin-walled part low enables the wall thickness to approach the set value.

BACKGROUND ART

Patent Literature

Patent Literature 1: Japanese Patent Application Publication No. Hei 11-179794

SUMMARY

Technical Problem

With such quality inspection, however, the condition for blow molding, such as the temperature of the preform, can be adjusted only after the blow molding process, and thus, the PET bottle is molded once with the condition for blow molding improperly adjusted. Therefore, optimization of the condition for blow molding requires repeating the molding of the PET bottle, which in turn leads to the problem of reducing production efficiency of the PET bottle.

An object of the present invention is to improve production efficiency of resin bottles by optimizing a condition for blow molding without repeating molding of the resin bottles.

Solution to Problem

In order to solve the foregoing problem, the present invention provides a method for producing a resin bottle formed from a preform as a prototype by a blow molding process, including a first step, a second step, and a third step. The first step measures each of weights or wall thicknesses of plural inspection parts set in a body portion of the preform. The second step compares each of the weights or the wall thicknesses measured by the first step with a preset set value, and thereby inspects a difference between each of the weights or the wall thicknesses measured by the first step and the set value for each of the inspection parts. The third step adjusts a condition for blow molding in the blow molding process in accordance with an inspection result of each of the inspection parts.

Here, in the present invention, it is preferable that, the third step comprises adjusting the condition for blow molding in the blow molding process by adjusting a temperature for each of the inspection parts. Also, it is preferable that, the third step comprises adjusting the condition for blow molding in the blow molding process by adjusting a pressure of air introduced into the preform. Also, it is preferable that, the third step comprises adjusting the condition for blow molding in the blow molding process by adjusting the timing of introduction of the air into the preform. Further, it is preferable that the first step comprises measuring the weight or the wall thickness for each of the inspection parts after the body portion of the preform has been cut for each of the inspection parts.

Advantageous Effects of Invention

According to the present invention, the weights or the wall thicknesses of the plural inspection parts set in the body portion of the preform are measured, and the difference between each of the measured weights or wall thicknesses and the set value is inspected for each of the inspection parts by comparing each of the measured weights or wall thicknesses with the preset set value. Then, the condition for blow molding in the blow molding process is adjusted in accordance with the inspection result of each of the inspection parts. Therefore, the condition for blow molding can be optimized without repeating the molding of the resin bottles, or equivalently, without undergoing the blow molding process, and thus, the production efficiency of the resin bottles can be improved.

DESCRIPTION OF EMBODIMENTS

Figure 1:
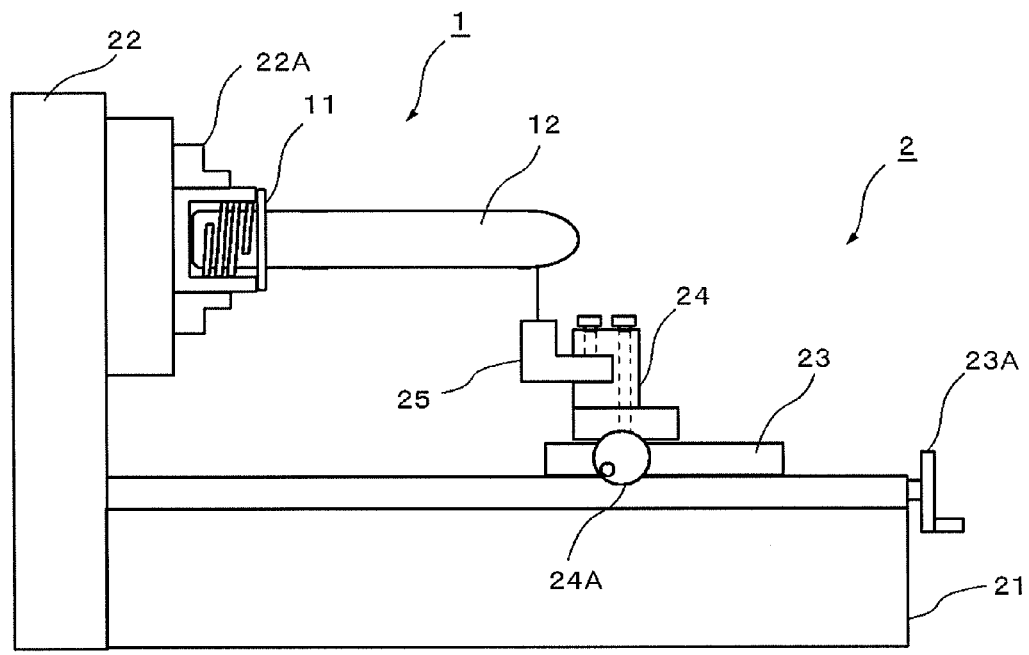
FIG. 1 is a schematic view of a preform and a cutting device therefore according to an embodiment of the present invention.
Figure 1:
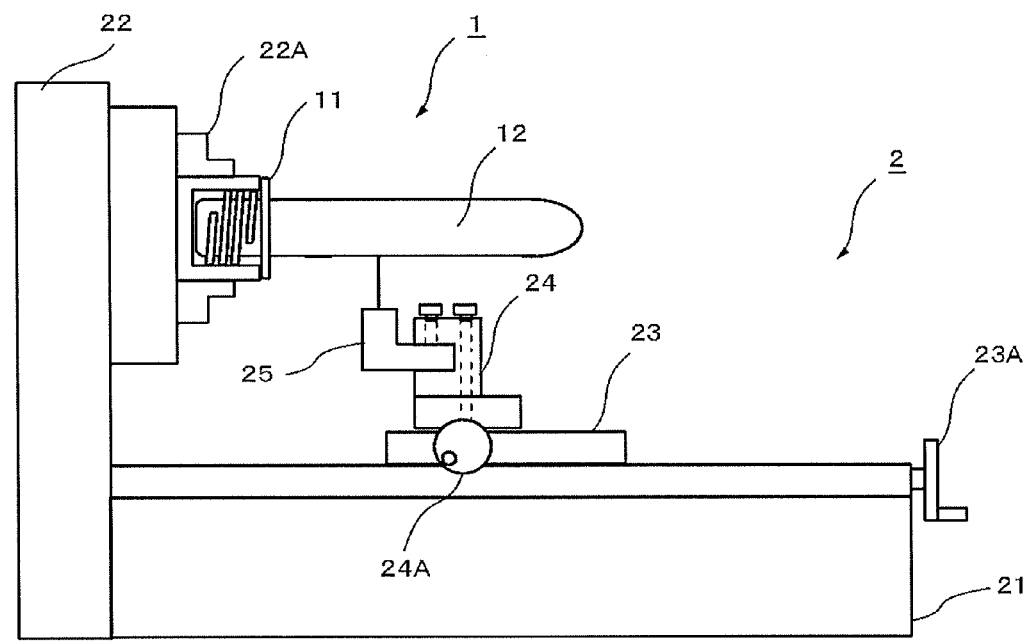

FIG. 1 is a schematic view of a preform and a cutting device therefore according to an embodiment of the present invention. A preform 1 as a prototype of a PET bottle (or a resin bottle) is formed in a closed-end cylindrical shape having an opening at one end and closed at the other end. The preform 1 includes a neck portion 11 on the opening side on which a threaded portion for screwing on a cap of the PET bottle is formed, and a body portion 12 as the remaining portion.

A cutting device 2 is a device for cutting the preform 1. The cutting device 2 uses a cutter in place of a cutting tool for a lathe, and is constructed mainly of a foundation 21, a spindle stock 22, and a slider 23. The spindle stock 22 includes a chuck 22A which is rotatable around an axis of rotation (or a main spindle), and a motor (unillustrated) for rotating the chuck 22A. A central axis of the chuck 22A coincides with the axis of rotation. The slider 23 is configured to be capable of advancing and retreating on the foundation 21 along a direction from side to side as seen in FIG. 1 by turning a handle 23A (see Parts (a) and (b) of FIG. 1). The slider 23 is provided with a tool rest 24. The tool rest 24 is configured to be capable of advancing and retreating on the slider 23 along a vertical direction as seen in FIG. 1 by turning a handle 24A. Also, the tool rest 24 has a cutter 25 fixed thereto in such a manner that the direction of a blade is orthogonal to the axis of rotation of the spindle stock 22.

Figure 2:
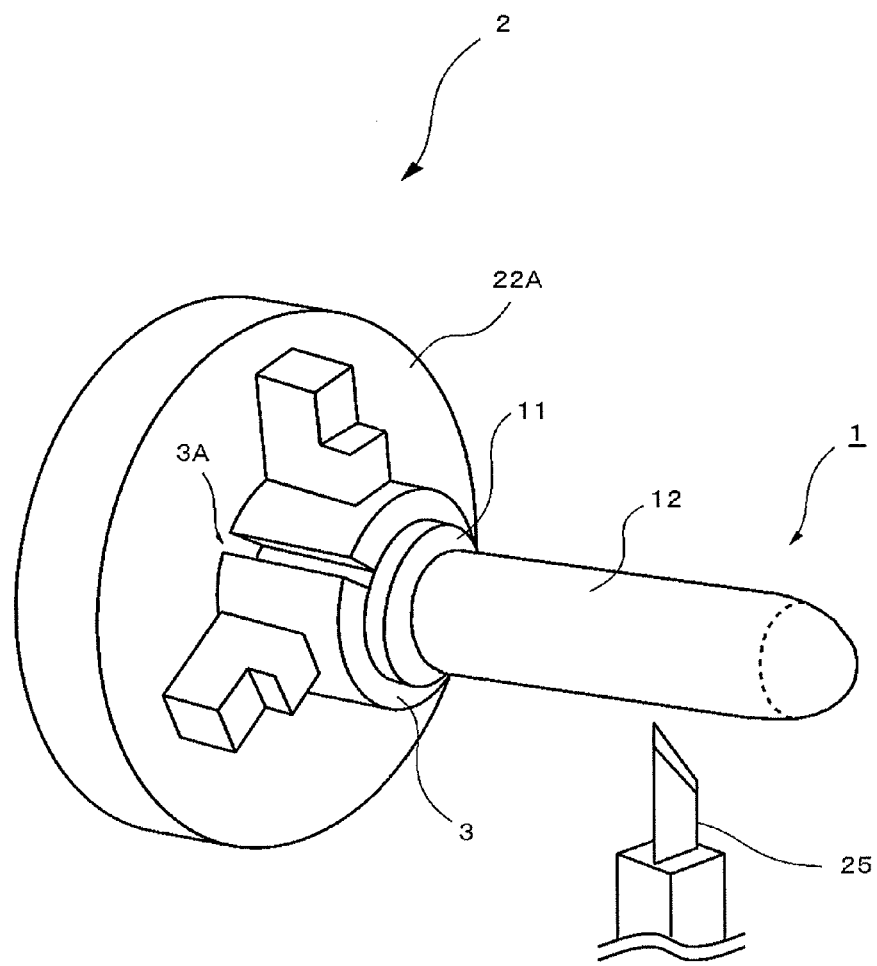
FIG. 2 is an enlarged perspective view of a chuck according to the embodiment.

FIG. 2 is an enlarged perspective view of the chuck 22A. The chuck 22A is a chuck with three claws. The chuck 22A grips the neck portion 11 of the preform 1 through a cylindrical nylon chuck 3. When the chuck 22A directly grips the neck portion 11, the three claws grip the uneven threaded portion formed on an outer periphery of the neck portion 11, and thus, the neck portion 11 cannot be fixed with stability. Therefore, it is difficult to bring a central axis of the preform 1 into coincidence with the central axis of the chuck 22A. Meanwhile, when the neck portion 11 is gripped through the nylon chuck 3, the neck portion 11 can be gripped with stability since the nylon chuck 3 has not an uneven surface. Therefore, the central axis of the preform 1 can be easily brought into coincidence with the central axis of the chuck 22A, or equivalently, the axis of rotation of the spindle stock 22 (see FIG. 1). Also, the nylon chuck 3 has a slit 3A formed along a direction of the central axis. This enables increasing and reducing the size of a diameter of the nylon chuck 3, thus facilitating attachment and detachment of the nylon chuck 3 to and from the neck portion 11.

Next, description will be given with regard to a method for inspecting the preform 1. The body portion 12 of the preform 1 has plural inspection parts preset therein. Then, the body portion 12 is divided into the inspection parts by cutting the preform 1 by using the cutting device 2. Specifically, first, the chuck 22A is caused to grip the neck portion 11 of the preform 1 in such a way as to bring the central axis of the preform 1 into coincidence with the axis of rotation of the spindle stock 22. Then, the handle 23A is turned to advance or retreat the slider 23 and move the blade of the cutter 25 to a predetermined position, or equivalently, a cutting position for each of the inspection parts. Then, the motor of the spindle stock 22 is driven to rotate the preform 1 around the axis of rotation. Then, the handle 24A is turned to move the tool rest 24 and force the blade of the cutter 25 into the body portion 12 of the preform 1. Thereby, the preform 1 is cut in section for each of the inspection parts along a direction orthogonal to the axis of rotation. At the time of this cutting, the preform 1 is cut by cutting off the inspection parts in sequence, starting at the inspection part far away from the neck portion 11.

Figure 3:
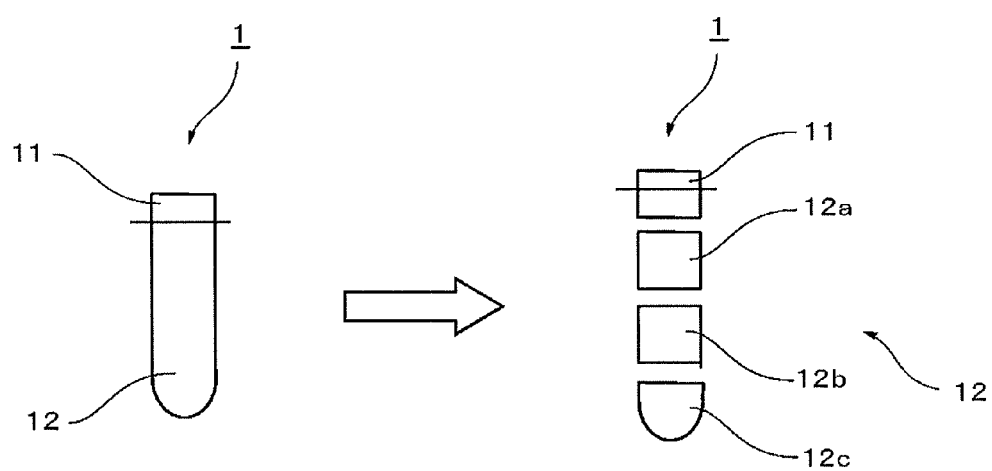
FIG. 3 is a view of a state of the preform according to the embodiment as cut for each of inspection parts.

FIG. 3 is a view of a state of the preform 1 as cut for each of the inspection parts. In an example of FIG. 3, the body portion 12 of the preform 1 exclusive of the neck portion 11 is divided into three inspection parts 12a to 12c. In quality inspection of the preform 1, after the body portion 12 has been cut for each of the inspection parts, wall thicknesses of the inspection parts 12a to 12c are measured (at a first step). Then, a difference between each of the wall thicknesses of the inspection parts 12a to 12c and a set value is inspected for each of the inspection parts by comparing each of the wall thicknesses of the inspection parts 12a to 12c with the preset set value (at a second step). Incidentally, the wall thicknesses of the inspection parts 12a to 12c may be estimated by measuring weights of the inspection parts 12a to 12c.

Figure 4:
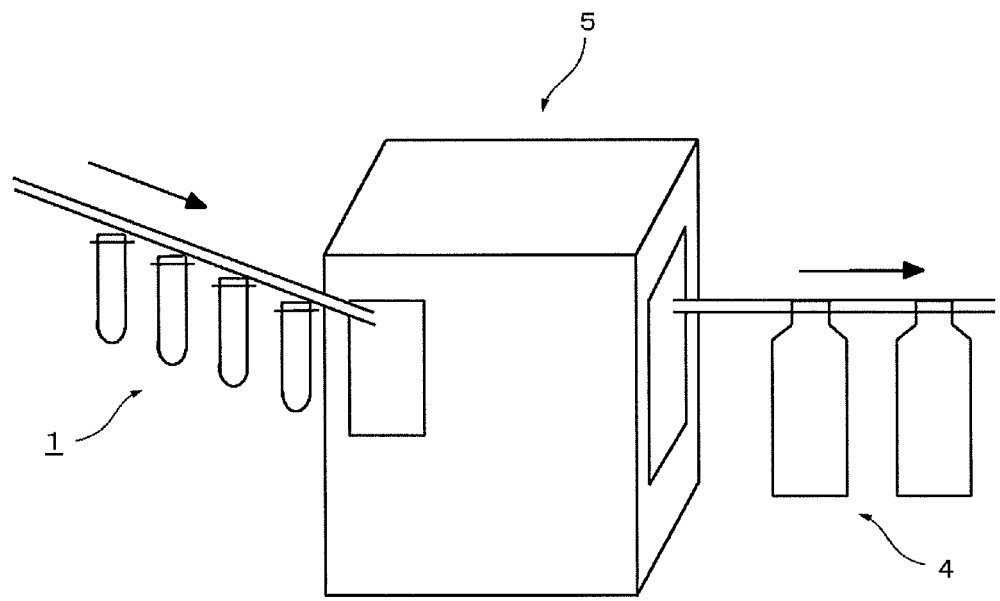
FIG. 4 is a general schematic view of a blow molding machine according to the embodiment.

FIG. 4 is a general schematic view of a blow molding machine. A PET bottle 4 is formed by charging the preform 1 into a blow molding machine 5, and executing a blow molding process. Description will be given below with regard to a method for producing the PET bottle 4.

Figure 5:
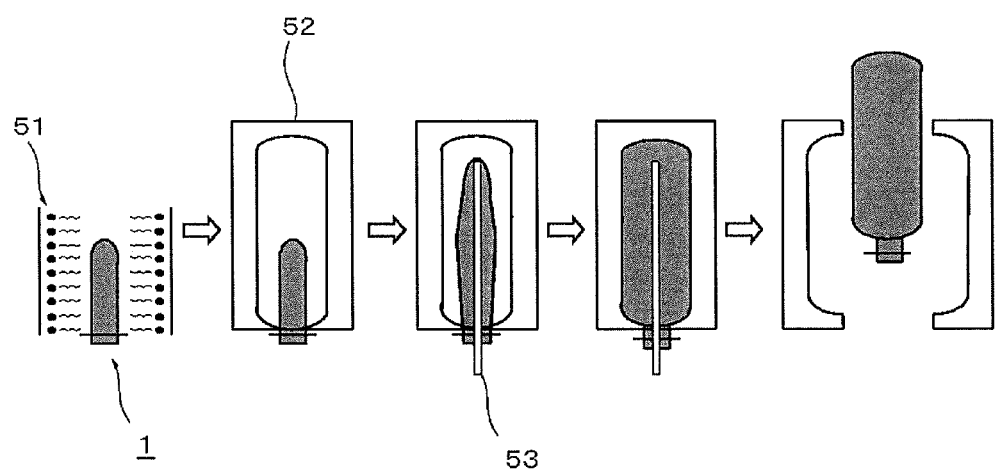
FIG. 5 is a view of assistance in explaining a process of blow molding according to the embodiment.

FIG. 5 is a view of assistance in explaining a process of blow molding. The blow molding process includes five processes. In a first process, a temperature is adjusted by heating the preform 1 by a heater 51 for blow molding provided in the blow molding machine 5. The heater 51 for blow molding is configured as plural heaters having a shape along an outer periphery of the preform 1, which are arranged along the central axis of the preform 1. In other words, the heater 51 for blow molding is provided for each of the inspection parts of the preform 1. In a second process, the body portion 12 of the preform 1 is inserted into a mold 52 formed in the same shape as an outer shape of the PET bottle 4. In a third process, a drawing rod 53 is inserted into the preform 1 through the opening of the neck portion 11 to press the preform 1 along the central axis and thereby press-draw the preform 1. In a fourth process, high-pressure air is introduced into the preform 1 through the opening of the neck portion 11 to expand the preform 1 so as to bring the preform 1 into intimate contact with the inside of the mold 52, thereby molding the PET bottle 4. In a fifth process, the PET bottle 4 is cooled, and thereafter, the mold 52 is opened to remove the PET bottle 4.

Figure 6:
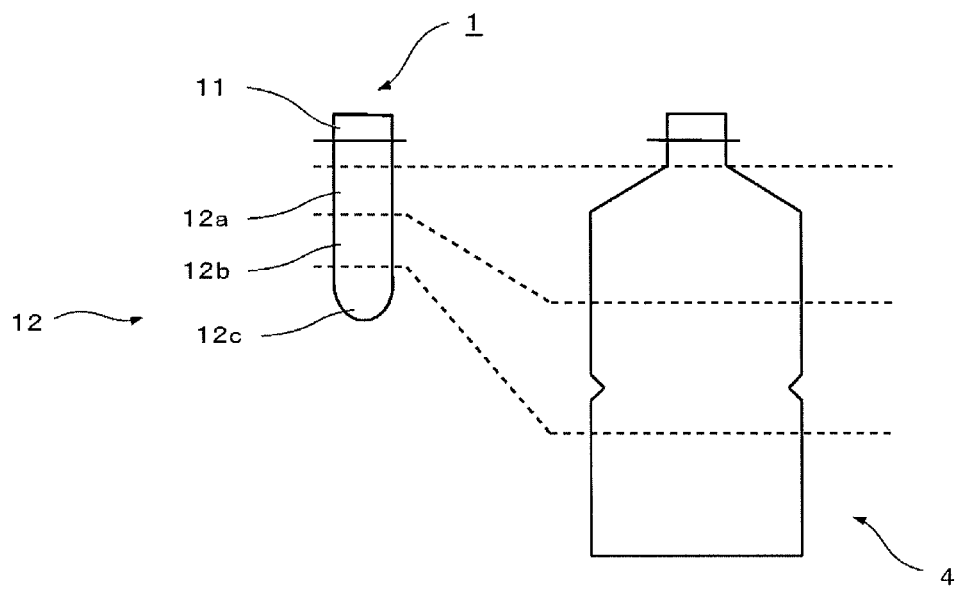
FIG. 6 is a view of correspondences between the preform and a PET bottle according to the embodiment.
Figure 7:
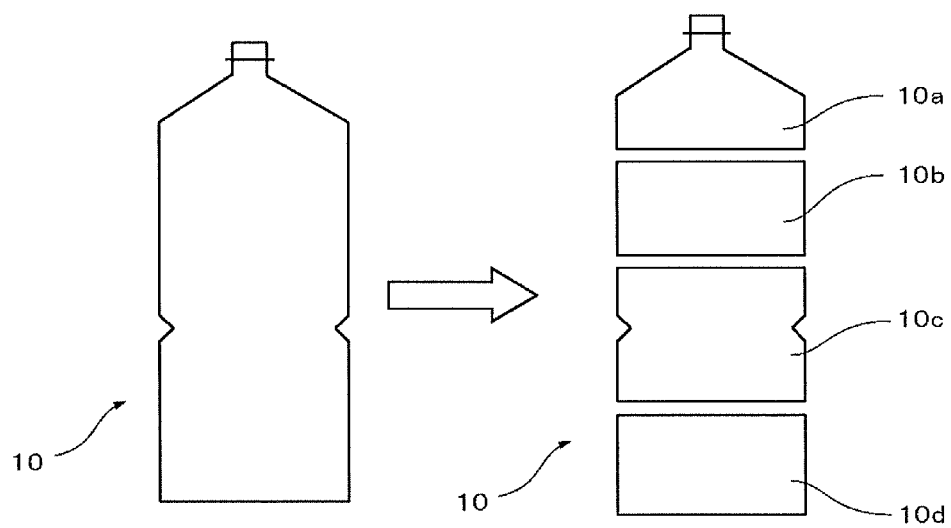
FIG. 7 is a view of a state of the PET bottle as cut for each of the inspection parts.

FIG. 6 is a view of correspondences between the preform and the PET bottle. In the second process, the temperature of the heater 51 for blow molding (or a condition for blow molding) is adjusted in accordance with an inspection result of each of the inspection parts of the preform 1 (at a third step). Here, in the blow molding process, a part having a relatively lower temperature than other parts is less likely to expand, while a part having a relatively higher temperature than other parts is more likely to expand. Therefore, the temperature of an inspection part in which the wall thickness is less than the set value is adjusted relatively lower than that of other inspection parts. Also, the temperature of an inspection part in which the wall thickness is greater than the set value is adjusted relatively higher than that of other inspection parts. For example, when the wall thickness of the inspection part 12a is less than the set value, the temperature of the heater 51 for blow molding for the inspection part 12a is set relatively lower than that for the other inspection parts 12b, 12c. This makes it more difficult for the inspection part 12a to expand in the blow molding process than the other inspection parts 12b, 12c. Therefore, the wall thickness of the inspection part 12a for the PET bottle 4 can be brought close to the set value.

According to the embodiment, as described above, the wall thicknesses of the plural inspection parts 12a to 12c set in the body portion 12 of the preform 1 are measured, and the difference between each of the measured wall thicknesses and the set value is inspected for each of the inspection parts by comparing each of the measured wall thicknesses with the preset set value. Then, the temperature of the heater 51 for blow molding is adjusted in accordance with the inspection result of each of the inspection parts. Therefore, the temperature of the heater 51 for blow molding can be optimized without repeating the molding of the PET bottle 4, and thus, production efficiency of the PET bottle 4 can be improved.

Incidentally, in the above-mentioned embodiment, the wall thicknesses of the inspection parts 12a to 12c are measured after the preform 1 has been cut by the cutting device 2. However, a device for measuring the shape of the preform, or the like, for example, may be used to measure the wall thicknesses of the inspection parts without cutting the preform. Also, the weights of the inspection parts rather than the wall thicknesses thereof may be measured. In short, the first step may be performed in any manner, provided only that the first step measures the weights or the wall thicknesses of the plural inspection parts set in the body portion of the preform.

Also, in the above-mentioned embodiment, the temperature of the heater 51 for blow molding is adjusted in accordance with the inspection result of each of the inspection parts of the preform 1. However, other conditions may be set as the condition for blow molding to be adjusted in accordance with the inspection result. For example, the pressure of the high-pressure air introduced into the preform may be adjusted. In this case, the pressure may be reduced to increase the wall thickness. Meanwhile, the pressure may be increased to reduce the wall thickness. Also, the timing of introduction of the high-pressure air into the preform, for example, may be adjusted. In this case, the timing may be delayed to reduce the temperature of the preform at the time of the introduction of the high-pressure air and thus increase the wall thickness. Meanwhile, the timing may be advanced to increase the temperature of the preform at the time of the introduction of the high-pressure air and thus reduce the wall thickness.

Further, in the above-mentioned embodiment, it is not necessary that the inspection of the preform 1 for each of the inspection parts be made on all preforms 1 to be blow-molded, and the inspection may be made only on some of the preforms charged into the blow molding machine 5. For example, one or more of the preforms 1 in the same production lot may be sampled for the inspection. In this case, the PET bottles can be produced by performing blow molding on all preforms 1 to be blow-molded, under the condition for blow molding adjusted in accordance with the inspection results of the one or more preforms 1.

INDUSTRIAL APPLICABILITY

As described above, the present invention is widely applicable to the method for producing the resin bottle formed from the preform as the prototype by the blow molding process.

REFERENCE SIGNS LIST 1 preform
2 cutting device
3 nylon chuck
3A slit
4 PET bottle (resin bottle)
5 blow molding machine
11 neck portion
12 body portion
12a-12c inspection parts
21 foundation
22 spindle stock
22A chuck
23 slider
23A handle
24 tool rest
24A handle
25 cutter
51 heater for blow molding
52 mold
53 drawing rod

The invention claimed is:

1. A method for producing a resin bottle formed from a preform as a prototype by a blow molding process, comprising:
   a first step of measuring each of weights or wall thicknesses of a plurality of inspection parts set in a body portion of the preform;
   a second step of comparing each of the weights or the wall thicknesses measured by the first step with a preset set value, and thereby inspecting a difference between each of the weights or the wall thicknesses measured by the first step and the set value for each of the inspection parts; and
   a third step of optimizing a condition for blow molding in the blow molding process in accordance with an inspection result of each of the inspection parts,
   wherein the optimizing in the third step comprises adjusting the condition for blow molding in the blow molding process by adjusting a pressure of air introduced into the preform.

2. The method for producing a resin bottle according to claim 1, wherein the third step further comprises adjusting the condition for blow molding in the blow molding process by adjusting a temperature for each of the inspection parts.

3. The method for producing a resin bottle according to claim 1, wherein the third step further comprises adjusting the condition for blow molding in the blow molding process by adjusting the timing of introduction of air into the preform.

4. The method for producing a resin bottle according to claim 1, wherein the first step comprises measuring the weight or the wall thickness for each of the inspection parts after the body portion of the preform has been cut for each of the inspection parts.

* * * * *